(12) United States Patent
Kwong

(10) Patent No.: US 7,365,802 B2
(45) Date of Patent: Apr. 29, 2008

(54) TELEVISION RECEIVER WITH ISOLATED INPUTS

(75) Inventor: Kam Choon Kwong, Singapore (SG)

(73) Assignee: NXP B.V., Eindhoven (NL)

( * ) Notice: Subject to any disclaimer, the term of this patent is extended or adjusted under 35 U.S.C. 154(b) by 611 days.

(21) Appl. No.: 10/519,062

(22) PCT Filed: Jun. 24, 2003

(86) PCT No.: PCT/IB03/02653

§ 371 (c)(1),
(2), (4) Date: Dec. 22, 2004

(87) PCT Pub. No.: WO2004/006567

PCT Pub. Date: Jan. 15, 2004

(65) Prior Publication Data

US 2005/0231645 A1    Oct. 20, 2005

(30) Foreign Application Priority Data

Jul. 5, 2002    (WO) .................... PCT/SG02/00163

(51) Int. Cl.
*H04N 5/268* (2006.01)
(52) U.S. Cl. .................... 348/705; 348/706
(58) Field of Classification Search ............... 348/705, 348/706, 725, 584, 598; 725/139, 151; *H04N 5/268*
See application file for complete search history.

(56) References Cited

U.S. PATENT DOCUMENTS

| | | | |
|---|---|---|---|
| 4,272,788 A | 6/1981 | Ogita | 358/189 |
| 4,742,393 A | 5/1988 | Sugai et al. | 358/188 |
| 5,142,371 A | 8/1992 | Lehmann | 358/191.1 |
| 5,355,532 A | 10/1994 | Kubo et al. | 455/301 |
| 5,686,974 A * | 11/1997 | Nayebi et al. | 348/705 |
| 6,020,936 A | 2/2000 | Brekelmans | 348/725 |
| 7,173,673 B2 * | 2/2007 | Sendelweck | 348/705 |

FOREIGN PATENT DOCUMENTS

| | | |
|---|---|---|
| DE | 3226980 | 1/1984 |
| JP | 58-184833 | 10/1983 |
| JP | 59-125181 | 7/1984 |
| JP | 6 153118 | 5/1994 |
| WO | WO 97/25781 | 7/1997 |

\* cited by examiner

*Primary Examiner*—Sherrie Hsia
(74) *Attorney, Agent, or Firm*—Peter Zawilski

(57) ABSTRACT

Receivers (1) comprising television and radio inputs (11,12) for receiving television and radio signals and comprising switching circuits (2) with two first switches (21,22) to be activated in a first mode and located parallelly to the television input (11) and with two second switches (23,24) to be activated in a second mode and located anti-serially to the radio input (12), and control circuits (3) for controlling the switching circuits (2) are modified in such a way that strong radio signals can no longer disturb the television signals. Thereby one of the first switches (21) and one of the second switches (23) together isolate the inputs (11,12) from each other, and the control circuit (3) supplies a first control signal to the first switches (21,22) and supplies a second control signal to non-common points of the anti-serial second switches (23,24). This kind of receivers (1) no longer need different switching circuits (2) for shielded radio inputs and unshielded radio inputs. The switches (21,22,23,24) are diodes, and the control circuit (3) comprises transistors (31,32) for controlling the diodes.

10 Claims, 1 Drawing Sheet

TELEVISION RECEIVER WITH ISOLATED INPUTS

Figure 1:
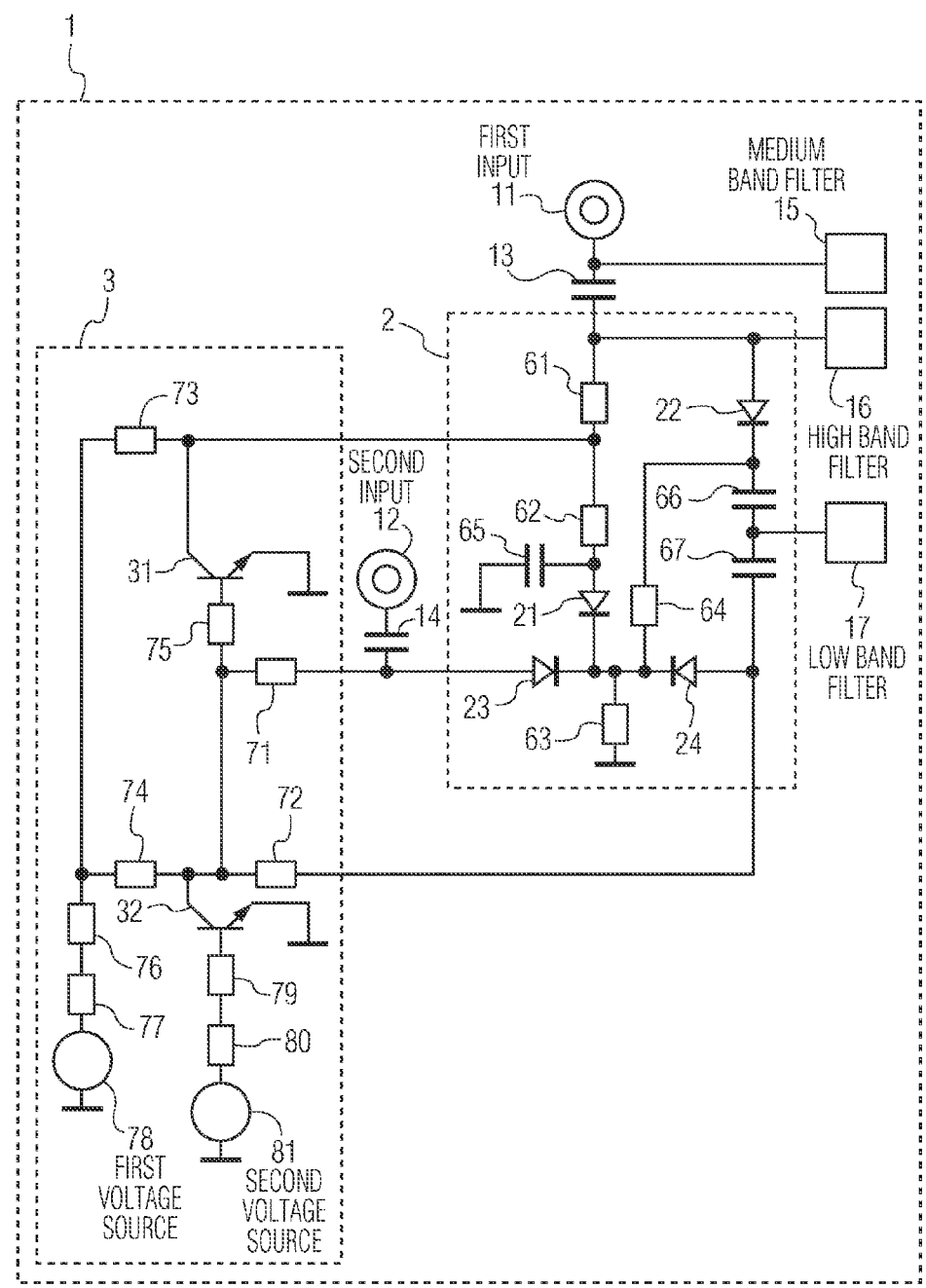

The invention relates to a receiver comprising a first input for receiving a first signal and comprising a second input for receiving a second signal and comprising a switching circuit with at least two first switches to be activated in a first mode and with at least two second switches to be activated in a second mode and comprising a control circuit for controlling the switching circuit.

The invention also relates to a switching circuit and a control circuit for use in such a receiver, to a television comprising such a receiver, and to a method comprising the steps of at a first input receiving a first signal and at a second input receiving a second signal, activating at least two first switches in a first mode, and activating at least two second switches in a second mode, and controlling the switching.

Such a receiver is for example a television receiver having the first (shielded) input to be coupled to for example a satellite disk or a cable or a television antenna for receiving first signals like for example television signals and having the second (shielded or unshielded) input to be coupled to for example a radio antenna (when for example shielded) or a wire (when for example unshielded) for receiving second signals like for example Frequency Modulated radio signals or FM radio signals. Generally, the first switches are located parallelly to the first input and are activated (made conducting) in a first (television) mode and the second switches are located anti-serially to the second input and are activated (made conducting) in a second (radio) mode, for example.

A prior art receiver is known from U.S. Pat. No. 6,020,936, which discloses in its second figure a TVIN (the first input) and a FMIN (second input) coupled to each other via four diodes D1-D4 (switches) of which in a TV mode D1 and D3 are conducting and D2 and D4 are not and in a FM mode D2 and D4 are conducting and D1 and D3 are not. This conducting and non-conducting is controlled by a control circuit generating the TV/FM signal (control signal). In view of TVIN, D1 and D3 are located parallelly, and in view of FMIN, D2 and D4 are located anti-serially.

The known receiver is disadvantageous, inter alia, due to strong second signals (strong FM signals) arriving via the second input (FMFN) disturbing the first signals (TV signals).

It is an object of the invention, inter alia, of providing a receiver as defined in the preamble in which there is a reduced disturbance of any first signals by strong second signals. The invention is defined by the independent claims. The dependent claims define advantageous embodiments.

By isolating the inputs from each other via at least two switches, compared to the prior art U.S. Pat. No. 6,020,936 where there is a coupling via just one switch D1 (plus one or more other elements) between the inputs, the inputs in the receiver according to the invention are much better isolated from each other. Even strong second signals can no longer disturb any first signals. Due to this better isolation, the first switches and the second switches now require (separated) first control signals and second control signals. When supplying the second control signal to (non-common points of) the (anti-serial) second switches, one of the first switches can be coupled advantageously to the common point of these (anti-serial) second switches.

The invention is based upon an insight, inter alia, that more switches in a coupling will bring more isolation, and is based upon a basic idea, inter alia, that one of the first switches should be shifted from (prior art) the non-common point of the anti-serial second switches—which non-common point is coupled to the second input—to (invention) the common point of these anti-serial second switches.

The invention solves the problem, inter alia, of providing a receiver as defined in the preamble which better isolates the inputs from each other, and is advantageous, inter alia, in that this kind of receivers no longer need different switching circuits for shielded second inputs and unshielded second inputs.

A first embodiment of the receiver according to the invention as defined in claim 2 is advantageous in that the first switches are diodes of which the anodes are coupled to the first input via one or more elements, with the second switches being diodes of which the cathodes form a common point. By supplying the first control signal to the anodes of the first switches and supplying the second control signal to the anodes of the second switches, the prior art inverter can be avoided. The diodes are advantageous low cost switches.

A second embodiment of the receiver according to the invention as defined in claim 3 is advantageous in that the cathode of the one of the first switches is coupled to the common point and that the cathode of the other one of the first switches is coupled to a filter-input via one or more elements, with an anode of one of the second switches being coupled to the second input via one or more elements and with an anode of the other one of the second switches being coupled to the filter-input via one or more elements. The elements for example comprise capacitors, inductors, resistors etc. for filtering purposes.

A third embodiment of the receiver according to the invention as defined in claim 4 is advantageous in that the receiver comprises a low band filter comprising the filter-input for low band filtering television signals and radio signals. The low band filter is then used for both kinds of signals, which is advantageous. Usually, there will be more filters, like a medium band filter and a high band filter, coupled to the first input via one or more elements for medium band filtering and high band filtering television signals.

A fourth embodiment of the receiver according to the invention as defined in claim 5 is advantageous in that the control circuit comprises a third switch of which a first contact is coupled to a common point of a first serial circuit of two resistors of which the non-common points are coupled to the anodes of the first switches, with the control circuit further comprising a fourth switch of which a first contact is coupled to a second contact of the first transistor and to a common point of a second serial circuit of two resistors of which the non-common points are coupled to the anodes of the second switches, with the common point of the second switches being coupled to ground via a resistor. This control circuit is an advantageous low cost, low complex control circuit. The resistor between the common point and ground allows both second switches to be biased reversibly for improved non-conduction.

A fifth embodiment of the receiver according to the invention as defined in claim 6 is advantageous in that the third switch comprises a first transistor and the fourth switch comprises a second transistor, with first contacts of the transistors being collectors, with second contacts of the transistors being bases, and with emitters of the transistors being coupled to ground, with the collectors each via at least one resistor being coupled to a first voltage source and with the basis of the first transistor being coupled to the collector of the second transistor via a resistor and with a basis of the second transistor being coupled to a second voltage source via at least one resistor. This control circuit generates the first control signal and the second control signal dependently upon the voltage sources and can therefore be controlled easily. The transistors are advantageous low cost switches.

Embodiments of the switching circuit according to the invention, of the control circuit according to the invention, of the television according to the invention and of the method according to the invention correspond with the embodiments of the receiver according to the invention.

These and other aspects of the invention will be apparent from and elucidated with reference to the embodiments(s) described hereinafter.

The sole FIGURE illustrates in block diagram form an embodiment of a receiver according to the invention comprising a switching circuit according to the invention and a control circuit according to the invention.

The receiver 1 according to the invention comprises a switching circuit 2 according to the invention and a control circuit 3 according to the invention.

Switching circuit 2 comprises two first switches 21,22 like for example diodes and two second switches 23,24 like for example diodes. An anode of diode 21 is coupled to ground via an element 65 for example comprising a capacitor and to a first non-common point of a first serial circuit 61,62 comprising resistors 61 and 62, of which a second non-common point is coupled to an anode of diode 22 and to a high band filter 16 and to a first input 11 via an element 13 for example comprising a capacitor. First input 11 is further coupled to a medium band filter 15.

A cathode of diode 22 is coupled via an element 66 for example comprising a capacitor to a filter-input of a low band filter 17 and to an element 67 for example comprising a capacitor, which is further coupled to an anode of diode 24. A cathode of diode 24 is coupled to a cathode of diode 21 and to a cathode of diode 23 and is coupled to ground via a resistor 63 and to the cathode of diode 22 via a resistor 64. An anode of diode 23 is coupled to a second input 12 via an element 14 for example comprising a capacitor.

Control circuit 3 comprises a third switch 31 for example in the form of a first transistor 31 (npn) of which an emitter is coupled to ground and of which a collector (first contact) is coupled to a common point of the first serial circuit 61,62 and via resistors 73,76 to a first voltage source 77,78. A basis (second contact) of first transistor 31 is coupled via a resistor 75 to a common point of a second serial circuit 71,72 comprising resistors 71 and 72, of which a first non-common point is coupled to the anode of diode 23 and of which a second non-common point is coupled to the anode of diode 24. Control circuit 3 further comprises a fourth switch 32 for example in the form of a second transistor 32 (npn).

The common point of the second serial circuit 71,72 is further coupled to a collector (first contact) of the second transistor 32 (npn) and via a resistor 74 and via the resistor 76 to the first voltage source 77,78. An emitter of second transistor 32 is coupled to ground, and a basis (second contact) is coupled via a resistor 79 to a second voltage source 80,81. Both voltage sources 77,78 and 80,81 comprise an internal resistance 77,80 and a source 78,81.

Receiver 1 functions as follows. In a first mode like for example a television mode, for example the first voltage source 77,78 is switched on and the second voltage source 80,81 is switched on. As a result, first transistor 31 is non-conductive, second transistor 32 is conductive, first diodes 21,22 are conductive and second diodes 23,24 are non-conductive, and first signals like for example television signals arriving at first input 11 flow to medium band filter 15 and via element 13 to high band filter 16 and via element 13 and diode 22 and element 66 to low band filter 17. Second signals like for example Frequency Modulated radio signals arriving at second input 12 are blocked by non-conductive diodes 23,24.

In a second mode like for example a radio mode, for example the first voltage source 77,78 is switched on and the second voltage source 80,81 is switched off. As a result, first transistor 31 is conductive, second transistor 32 is non-conductive, first diodes 21,22 are non-conductive and second diodes 23,24 are conductive, and first signals like for example television signals arriving at first input 11 are blocked by non-conductive diode 22. Second signals like for example Frequency Modulated radio signals arriving at second input 12 now flow via element 14 and conductive diodes 23,24 and element 67 to low band filter 17.

For both modes, one low band filter 17 can be advantageously used for both inputs 11,12. By isolating the inputs 11,12 from each other via at least two diodes 23,21, compared to the prior art U.S. Pat. No. 6,020,936 where there is a coupling via just one diode 21 (plus one or more other elements) between the inputs 11,12, with diode 21 according to this prior art not being coupled to the cathode of diode 23 but to the anode of diode 23, the inputs 11,12 in the receiver 1 according to the invention are much better isolated from each other. Even strong second signals like strong radio signals can no longer disturb any first signals like television signals. Due to this better isolation, the first diodes 21,22 and the second diodes 23,24 now require (separated) first control signals arriving via the first serial circuit of resistors 61,62 and second control signals arriving via the second serial circuit of resistors 71,72. When supplying the second control signal to non-common points of the anti-serial second diodes 23,24, one of the first diodes 21 can be coupled advantageously to the common point of these anti-serial second diodes 23,24.

In the first mode, the resistor 63 forms a voltage divider together with resistors 62 and 73 for the first voltage source 77,78 and thereby allows both second diodes 23,24 to be biased reversibly for improved non-conduction (the voltage at the anodes of these first diodes can then be lower than the voltage at their cathodes). As a result, intermodulation products due to non-linearities of switching diodes are avoided.

The invention is based upon an insight, inter alia, that more switches in a coupling will bring more isolation, and is based upon a basic idea, inter alia, that one of the first switches 21,22 should be shifted from (prior art) the non-common point of the anti-serial second switches 23,24—which non-common point is coupled to the second input 12—to (invention) the common point of these anti-serial second switches 23,24.

The invention solves the problem, inter alia, of providing a receiver 1 which better isolates the inputs 11,12 from each other, and is advantageous, inter alia, in that this kind of receivers 1 no longer need different switching circuits 2 for shielded second inputs 12 and unshielded second inputs 12.

The switches 21-24 can be diodes or can be transistors etc. The transistors 31 and 32 can be npn transistors or pnp transistors or FETs or MOSFETs etc. and can comprise other embodiments of general switches. The elements can be much more complex and other elements are not to be excluded and certain elements may be combined and/or deleted (like for example either resistor 76 or resistors 73,74), and further inputs and/or further filters and/or further modes are not to be excluded, this all without departing from the scope of this invention.

For example serially to each filter 15-17 there may be an inductor. Between input 11 and element 13 there may be for example an element group of a capacitor Ca of which both sides are coupled to ground each via an inductor La,Lb, with a parallel circuit of a capacitor Cb and an inductor Lc being coupled serially to the capacitor Ca. Instead of element 14 being coupled to resistor 71 and the anode of diode 23, there may be for example an element group of a parallel circuit of a capacitor Cx and an inductor Lx coupled to the input 12 and via a capacitor Cw to the anode of the diode 23, with both sides of the capacitor Cy being coupled to ground, a first side (which is coupled to the parallel circuit) via an inductor Ly and a second side (which is coupled to the anode) via a serial circuit of an inductor Lz and a capacitor Cz, of which serial circuit the common point is then coupled to the resistor 71. And serially to low band filter 17, there may be for example a parallel circuit of a capacitor and a resistor.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. Receiver comprising:
   a first input for receiving a first signal;
   a second input for receiving a second signal;
   a switching circuit with at least two first switches to be activated in a first mode and with at least two second switches to be activated in a second mode; and
   a control circuit for controlling the switching circuit, characterized in that at least one of the first switches and at least one of the second switches together isolate at least one of the inputs from the other, with the control circuit supplying a first control signal to the first switches and supplying a second control signal to the second switches.

2. Receiver according to claim 1, characterized in that the first switches are diodes of which the anodes are coupled to the first input via one or more elements, with the second switches being diodes of which the cathodes form a common point.

3. Receiver according to claim 2, characterized in that the cathode of the one of the first switches is coupled to the common point and that the cathode of the other one of the first switches is coupled to a filter-input via one or more elements, with an anode of one of the second switches being coupled to the second input via one or more elements and with an anode of the other one of the second switches being coupled to the filter-input via one or more elements.

4. Receiver according to claim 3, characterized in that the receiver comprises a low band filter comprising the filter-input for low band filtering television signals and radio signals.

5. Receiver according to claim 4, characterized in that the control circuit comprises a third switch of which a first contact is coupled to a common point of a first serial circuit of two resistors of which the non-common points are coupled to the anodes of the first switches, with the control circuit further comprising a fourth switch of which a first contact is coupled to a second contact of the third switch and to a common point of a second serial circuit of two resistors of which the non-common points are coupled to the anodes of the second switches, with the common point of the second switches being coupled to ground via a resistor.

6. Receiver according to claim 5, characterized in that the third switch comprises a first transistor and the fourth switch comprises a second transistor, with first contacts of the transistors being collectors, with second contacts of the transistors being bases, and with emitters of the transistors being coupled to ground, with the collectors each via at least one resistor being coupled to a first voltage source and with the basis of the first transistor being coupled to the collector of the second transistor via a resistor and with a basis of the second transistor being coupled to a second voltage source via at least one resistor.

7. Switching circuit for use in a receiver comprising a first input for receiving a first signal, a second input for receiving a second signal, and the switching circuit with at least two first switches to be activated in a first mode and with at least two second switches to be activated in a second mode, characterized in that at least one of the first switches and at least one of the second switches together isolate at least one of the inputs from the other.

8. Control circuit for use in a receiver comprising a first input for receiving a first signal, a second input for receiving a second signal, a switching circuit with at least two first switches to be activated in a first mode and with at least two second switches to be activated in a second mode, and the control circuit for controlling the switching circuit, characterized in that at least one of the first switches and at least one of the second switches together isolate at least one of the inputs from the other, with the control circuit supplying a first control signal to the first switches and supplying a second control signal to the second switches.

9. Television comprising a receiver comprising a first input for receiving a first signal and comprising a second input for receiving a second signal and comprising a switching circuit with at least two first switches to be activated in a first mode and with at least two second switches to be activated in a second mode and comprising a control circuit for controlling the switching circuit, characterized in that at least one of the first switches and at least one of the second switches together isolate at least one of the inputs from the other, with the control circuit supplying a first control signal to the first switches and supplying a second control signal to the second switches.

10. Method comprising the steps of:
   at a first input receiving a first signal;
   at a second input receiving a second signal;
   activating at least two first switches in a first mode;
   activating at least two second switches in a second mode; and
   controlling the switching,
   characterized in that at least one of the first switches and at least one of the second switches together isolate at least one of the inputs from the other, with the step of controlling comprising the steps of supplying a first control signal to the first switches and of supplying a second control signal to the second switches.

* * * * *